United States Patent [19]
Olson et al.

[11] Patent Number: 5,410,657
[45] Date of Patent: Apr. 25, 1995

[54] METHOD AND SYSTEM FOR HIGH SPEED FLOATING POINT EXCEPTION ENABLED OPERATION IN A MULTISCALAR PROCESSOR SYSTEM

[75] Inventors: Christopher H. Olson; Terence M. Potter, both of Austin, Tex.

[73] Assignee: International Business Machines Corporation, Armonk, N.Y.

[21] Appl. No.: 959,193

[22] Filed: Oct. 9, 1992

[51] Int. Cl.⁶ .................... G06F 9/28; G06F 9/30; G06F 15/16; G06F 15/347
[52] U.S. Cl. .................... 395/375; 395/800; 395/425; 364/DIG. 1; 364/DIG. 2; 364/230.2; 364/261.5; 364/931.48; 364/931.51; 364/931.52; 364/941.1
[58] Field of Search ................ 395/800, 425, 375

[56] References Cited
U.S. PATENT DOCUMENTS

| | | | |
|---|---|---|---|
| 4,780,811 | 10/1988 | Aoyama | 395/375 |
| 4,833,599 | 5/1989 | Colwell et al. | 395/650 |
| 5,006,980 | 4/1991 | Sanders et al. | 395/375 |
| 5,043,867 | 8/1991 | Bhandarkov et al. | 395/375 |
| 5,075,840 | 12/1991 | Grohoski et al. | 395/800 |
| 5,109,514 | 4/1992 | Garner et al. | 395/125 |
| 5,127,091 | 6/1992 | Boufarah et al. | 395/375 |
| 5,134,693 | 7/1992 | Saini | 395/375 |
| 5,193,158 | 3/1993 | Kinney et al. | 395/375 |
| 5,197,138 | 3/1993 | Hobbs et al. | 395/375 |

*Primary Examiner*—Parshotam S. Lall
*Assistant Examiner*—Timothy Lee Philipp
*Attorney, Agent, or Firm*—Michael A. Davis; Andrew J. Dillon

[57] ABSTRACT

A method and system are disclosed for implementing floating point exception enabled operation without substantial performance degradation. In a multiscalar processor system, multiple instructions may be issued and executed simultaneously utilizing multiple independent functional units. This is typically accomplished utilizing separate branch, fixed point and floating point processor units. Floating point arithmetic instructions within the floating point processor unit may initiate one of a variety of exceptions associated within invalid operations and as a result of the pipelined nature of floating point processor units an identification of which instruction initiated the exception is not possible. In the described method and system, an associated dummy instruction having a retained instruction address is dispatched to the fixed point processor unit each time a floating point arithmetic instruction is dispatched to the floating point processor unit. Thereafter, the output of each instruction from the floating point processor unit is synchronized with an output of an associated dummy instruction wherein each instruction within the floating point processor unit which initiates a floating point exception may be accurately identified utilizing the retained instruction address of the associated dummy instruction.

6 Claims, 3 Drawing Sheets

METHOD AND SYSTEM FOR HIGH SPEED FLOATING POINT EXCEPTION ENABLED OPERATION IN A MULTISCALAR PROCESSOR SYSTEM

BACKGROUND OF THE INVENTION

1. Technical Field

The present invention relates in general to enhanced performance in multiscalar processor systems and in particular to a method and system for enabling floating point exception operation in a multiscalar processor system. Still more particularly, the present invention relates to a method and system for enabling floating point exception operation in a multiscalar processor system without substantial performance degradation.

2. Description of the Related Art

Designers of modern state-of-the-art data processing systems are continually attempting to enhance the performance aspects of such systems. One technique for enhancing data processing system efficiency is the achievement of short cycle times and a low Cycle's-Per-Instruction (CPI) ratio. An excellent example of the application of these techniques to an enhanced data processing system is the International Business Machines Corporation RISC System/6000 (RS/6000) computer. The RS/6000 system is designed to perform well in numerically intensive engineering and scientific applications as well as in multi-user, commercial environments. The RS/6000 processor employs a multiscalar implementation, which means that multiple instructions are issued and executed simultaneously.

The simultaneous issuance and execution of multiple instructions requires independent functional units that can execute concurrently with a high instruction bandwidth. The RS/6000 system achieves this by utilizing separate branch, fixed point and floating point processing units which are pipelined in nature. In such systems a significant pipeline delay penalty may result from the execution of conditional branch instructions. Conditional branch instructions are instructions which dictate the taking of a specified conditional branch within a application in response to a selected outcome of the processing of one or more other instructions. Thus, by the time a conditional branch instruction propagates through a pipeline queue to an execution position within the queue, it will have been necessary to load instructions into the queue behind the conditional branch instruction prior to resolving the conditional branch in order to avoid run-time delays.

Another source of delays within multiscalar processor systems is the nonsynchronous nature of the operation of a floating point processor unit. Instruction addresses for instructions which are coupled to a floating point processor unit are lost and thus, in the event an instruction within a floating point processor unit cannot be executed, the exception caused by that failure to execute will stop the entire process. The Institute of Electrical and Electronics Engineers has promulgated a listing of a variety of exceptions which may occur within a floating point processor unit and how those exceptions should be handled. See IEEE Standard for Binary Floating-Point Arithmetic, ANSI/IEEE Std. 754-1985. Some of these exceptions include Overflow, Underflow, Inexact, Invalid Operation, Divide by Zero, and others. Each of these exceptions has an associated capability to permit a trap to be taken or to return to some specified default result.

Floating point processor unit hardware typically specifies the exceptions that can be generated and how those exceptions are to be handled by the hardware in conformance with the IEEE standard. In prior art multiscalar processor systems two methods are generally available to transfer program execution from the application to an appropriate trap handler upon the occurrence of an exception: software polling; and, hardware interrupt. Software polling has an advantage in performance. Software can select when to poll for a possible enabled exception. For example, if the Divide-by-Zero exception is the only trap-enabled exception, the compiler may place the polling branch and link on exception instruction after each floating-point divide instruction. This method may be utilized if the type of exception handling can be determined at the time a program is compiled.

Due to the difficulty of determining what kind of exception may be encountered during an application execution it may be necessary to implement precise hardware interrupt handling of an exception. This mode of operation is generally known as precise floating point exception enabled operation and is typically implemented by placing the entire processor into a mode of executing only one instruction at a time. Each instruction must complete before the next instruction will be dispatched, including fixed point instructions. This method allows traps to be enabled or disabled at run time and permits a precise address for the instruction which caused the exception to be identified. While this technique permits the exact identification of an instruction which initiates a floating point exception, it typically results in a performance degradation of five to ten times the nominal processor speed.

Thus, it should be apparent to those skilled in the art that it would be beneficial to have a method and system which permits floating point exception enabled operation within a multiscalar processor system without substantially degrading processor performance.

SUMMARY OF THE INVENTION

It is therefore one object of the present invention to provide enhanced performance in a multiscalar processor system.

It is another object of the present invention to provide an improved method and system for floating point exception enabled operation in a multiscalar processor system.

It is yet another object of the present invention to provide an improved method and system for floating point exception enabled operation in a multiscalar processor system which does not result in substantial performance degradation.

The foregoing objects are achieved as is now described. The method and system of the present invention may be utilized to implement floating point exception enabled operation without substantial performance degradation. In a multiscalar processor system, multiple instructions may be issued and executed simultaneously utilizing multiple independent functional units. This is typically accomplished utilizing separate branch, fixed point and floating point processor units. Floating point arithmetic instructions within the floating point processor unit may initiate one of a variety of exceptions associated within invalid operations and as a result of the pipelined nature of floating point processor units an identification of which instruction initiated the exception is not possible. In the described method and system, an associated dummy instruction having a retained instruction address is dispatched to the fixed point processor unit each time a floating point arithmetic instruction is dispatched to the floating point processor unit. Thereafter, the output of each instruction from the floating point processor unit is synchronized with an output of an associated dummy instruction wherein each instruction within the floating point processor unit which initiates a floating point exception may be accurately identified utilizing the retained instruction address of the associated dummy instruction The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
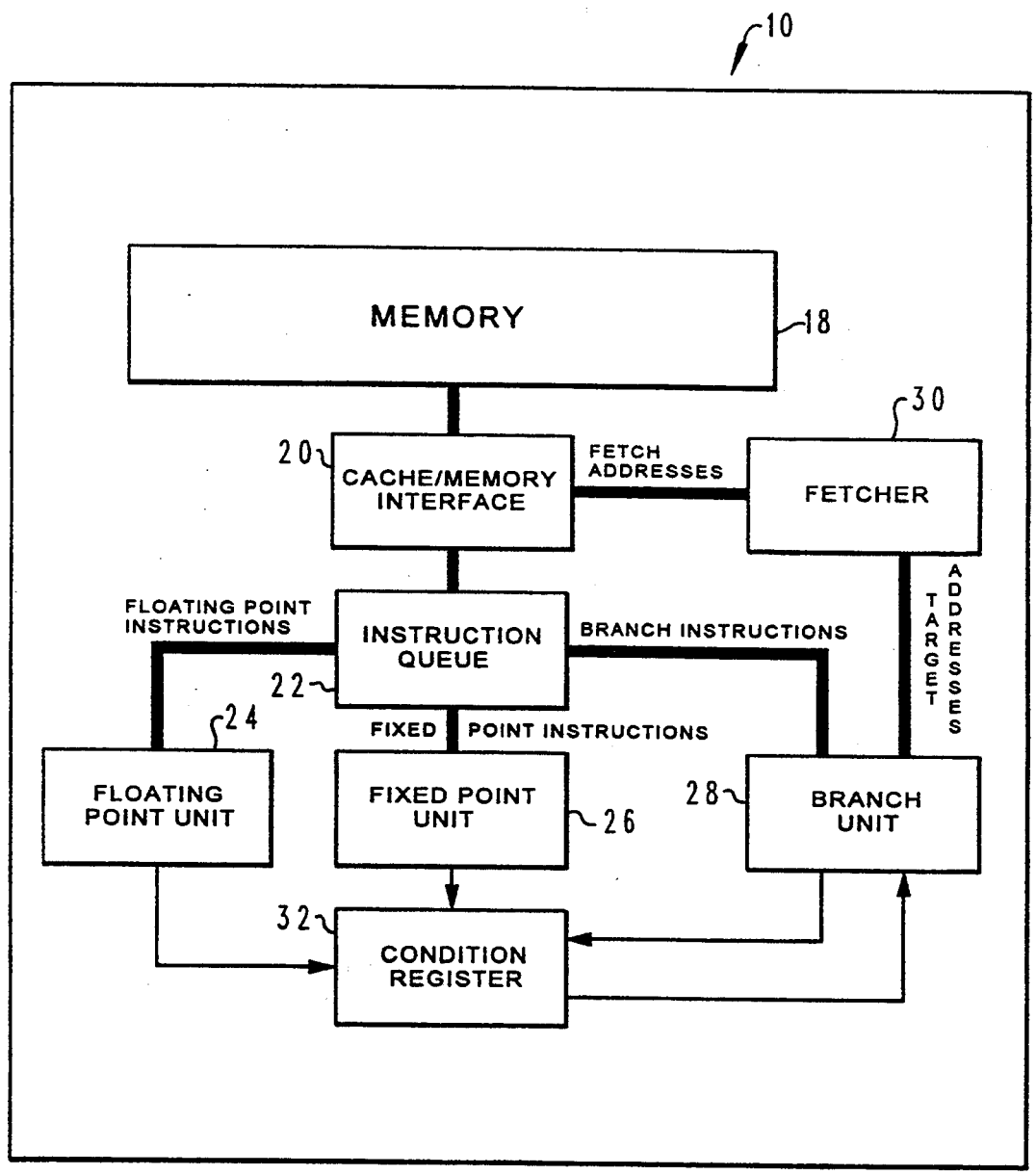
FIG. 1 is a high level block diagram of a multiscalar computer system which may be utilized to implement the method and system of the present invention.

With reference now to the figures and in particular with reference to FIG. 1, there is depicted a high level block diagram of a multiscalar computer system 10 which may be utilized to implement the method and system of the present invention. As illustrated, computer system 10 preferably includes a memory 18 which is utilized to store data, instructions and the like. Data or instructions stored within memory 18 are preferably accessed utilizing cache/memory interface 20 in a method well known to those having skill in the art. The sizing and utilization of cache memory systems is a well known subspecialty within the data processing art and not addressed within the present application. However, those skilled in the art will appreciate that by utilizing modern associative cache techniques a large percentage of memory accesses may be achieved utilizing data temporarily stored within cache/memory interface 20.

Instructions from cache/memory interface 20 are typically loaded into instruction queue 22 which preferably includes a plurality of queue positions. In a typical embodiment of a multiscalar computer system the instruction queue may include eight queue positions and thus, in a given cycle, between zero and eight instructions may be loaded into instruction queue 22, depending upon how many valid instructions are passed by cache/memory interface 20 and how much space is available within instruction queue 22.

As is typical in such multiscalar computer systems, instruction queue 22 is utilized to dispatch instructions to multiple execution units. As depicted within FIG. 1, computer system 10 includes a floating point processor unit 24, a fixed point processor unit 26, and a branch processor unit 28. Thus, instruction queue 22 may dispatch between zero and three instructions during a single cycle, one to each execution unit.

In addition to sequential instructions dispatched from instruction queue 22, so-called "conditional branch instructions" may be loaded into instruction queue 22 for execution by the branch processor. A conditional branch instruction is an instruction which specifies an associated conditional branch to be taken within the application in response to a selected outcome of processing one or more sequential instructions. In an effort to minimize run-time delay in a pipelined processor system, such as computer system 10, the presence of a conditional branch instruction within the instruction queue is detected and an outcome of the conditional branch is predicted. As should be apparent to those having skill in the art when a conditional branch is predicted as "not taken" the sequential instructions within the instruction queue simply continue along a current path and no instructions are altered. However, if the prediction as to the occurrence of the branch is incorrect, the instruction queue must be purged of sequential instruction, which follow the conditional branch instruction in program order and target instructions must be fetched. Alternately, if the conditional branch is predicted as "taken" then the target instructions are fetched and utilized to follow the conditional branch, if the prediction is resolved as correct. And of course, if the prediction of "taken" is incorrect the target instructions must be purged and the sequential instructions which follow the conditional branch instruction in program order must be retrieved.

As illustrated, computer system 10 also preferably includes a condition register 32. Condition register 32 is utilized to temporarily store the results of various comparisons which may occur utilizing the outcome of sequential instructions which are processed within computer system 10. Thus, floating point processor unit 24, fixed point processor unit 26 and branch processor unit 28 are all coupled to condition register 32. The status of a particular condition within condition register 32 may be detected and coupled to branch processor unit 28 in order to generate target addresses, which are then utilized to fetch target instructions in response to the occurrence of a condition which initiates a branch.

Thereafter, a branch processor unit 28 couples target addresses to fetcher 30. Fetcher 30 calculates fetch addresses for the target instructions necessary to follow the conditional branch and couples those fetch addresses to cache/memory interface 20. As will should appreciated by those having skill in the art, if the target instructions associated with those fetch addresses are present within cache/memory interface 20, those target instructions are loaded into instruction queue 22. Alternately, the target instructions may be fetched from memory 18 and thereafter loaded into instruction queue 22 from cache/memory interface 20 after a delay required to fetch those target instructions.

Figure 2:
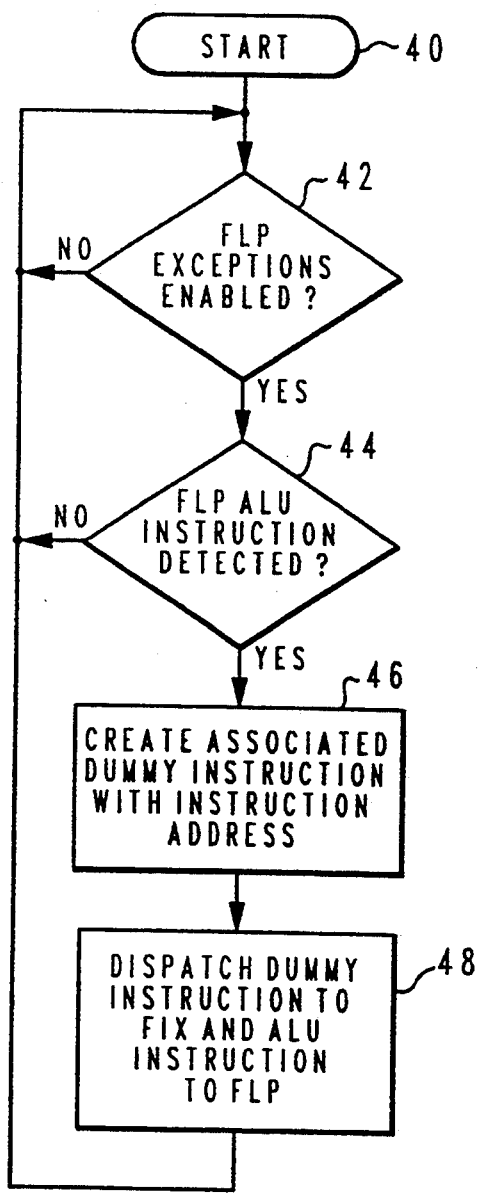
FIG. 2 is a high level logic flowchart illustrating the establishment of high speed floating point exception enabled operation in accordance with the method and system of the present invention.

Referring now to FIG. 2 there is depicted a high level logic flowchart illustrating the establishment of high speed floating point exception operation in accordance with the method and system of the present invention. As illustrated, the process begins at block 40 and thereafter passes to block 42. Block 42 illustrates a determination of whether or not the floating point exception enabled mode of operation has been selected. As described above, a standard exists for floating point exceptions published by the *IEEE, A Standard for Binary Floating Point Arithmetic* ANSI/IEEE Standard 754–1985.

Examples of floating point operations which may initiate exceptions include Overflow, Underflow, Inexact, Invalid Operation, Divide by Zero and others. In view of the pipelined and asynchronous nature of a floating point processor unit, when an exception occurs it is not possible to determine the exact floating point instruction which initiated that exception. In prior art system,s in order to provide a precise indication of which floating point instruction initiated an exception, a so-called "precise" floating point exception enabled operation was utilized. In a precise floating point exception enabled operation, each instruction must be completed before the next instruction will be dispatched to either the floating point processor unit or the fixed point processor unit. This technique makes it possible to identify the instruction which initiated a floating point exception; however, it results in a performance degradation by a factor of 5-10. Thus, those skilled in the art will appreciate that it would be desirable to be able to operate in a floating point exception enabled mode at a higher system speeds.

Still referring to FIG. 2, in the event the floating point exception enabled mode is not selected, the process depicted therein simply iterates until such time as the floating point exception enabled mode has been selected. However, assuming that the floating point exception mode is enabled, the process passes to block 44. Block 44 illustrates a determination of whether or not a floating point arithmetic instruction (alu) has been detected within the instruction queue for dispatch to the floating point processor unit. If not, the process again returns to block 42 to determine whether or not the floating point exception enabled mode is still selected.

Still referring to block 44, in the event a floating point arithmetic instruction (alu) has been detected, the process passes to block 46. Block 46 illustrates the creation of an associated dummy instruction with an instruction address which may be retained in an instruction address register during processing of the dummy instruction by the fixed point processor unit. Thereafter, as depicted at block 48, the dummy instruction is dispatched to the fixed point processor unit simultaneously with the dispatching of the floating point arithmetic instruction (alu) to the floating point processor unit. Thereafter, the process again returns to block 42 for a determination of whether or not the floating point exception enabled mode is still selected.

Figure 3:
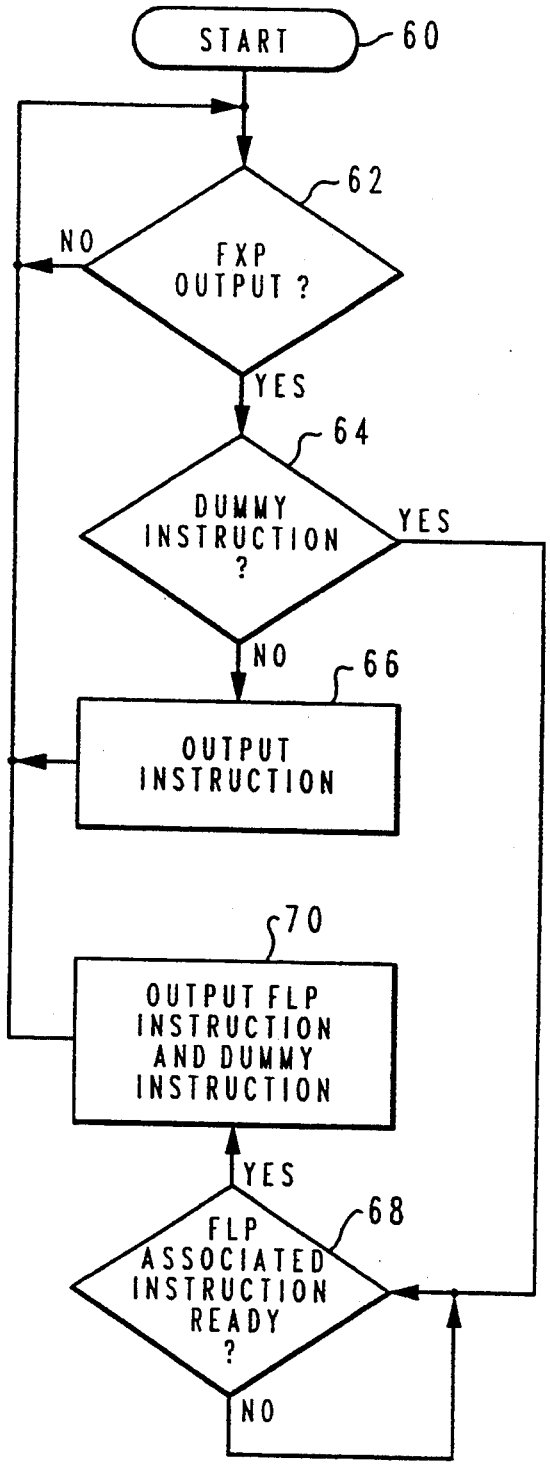
FIG. 3 is a high level logic flowchart illustrating the synchronization of fixed point processor unit output with an output with an output from the floating point processor unit in accordance with the method and system of the present invention.

With reference now to FIG. 3, there is depicted a high level logic flowchart which illustrates the synchronization of the output of fixed point processor unit 26 with an output from the floating point processor unit 24 in accordance with the method and system of the present invention (see FIG. 1). As illustrated within FIG. 3, the process begins at block 60 and thereafter passes to block 62. Block 62 illustrates a determination of whether or not an instruction within the fixed point processor unit is about to clear write-back and be output from the fixed point processor unit. If not, the process merely iterates until such time as that event occurs.

Still referring to block 62, in the event an imminent output is detected from the fixed point processor unit, the process passes to block 64. Block 64 illustrates a determination of whether or not the imminent output is a dummy instruction created in accordance with the process depicted within FIG. 2. If not, the process merely passes to block 66 which illustrates the outputting of that instruction and the process then returns to block 62, in an iterative fashion, to await the next output of an instruction from the fixed point processor unit.

Referring again to block 64, in the event the instruction about to be output from the fixed point processor unit is a dummy instruction, the process passes to block 68. Block 68 illustrates a determination of whether or not the associated arithmetic instruction within the floating point processor is ready for output and, if not, the process iterates and the output of the fixed point processor unit is gated until such time as the floating point processor unit associated instruction is ready for output. After a determination that the associated arithmetic instruction within the floating point processor is ready for output, the process passes to block 70. Block 70 illustrates the output of the associated floating point instruction from the floating processor unit and the output of the dummy instruction from the fixed point processor unit. In this manner, the address of a floating point processor unit arithmetic instruction which caused the initiation of an exception may be accurately determined upon a reference to the instruction address of the dummy instruction which is associated with each floating point processor unit arithmetic instruction. Thereafter, as described above, the process returns to block 62 and repeats in an iterative fashion.

Figure 4:
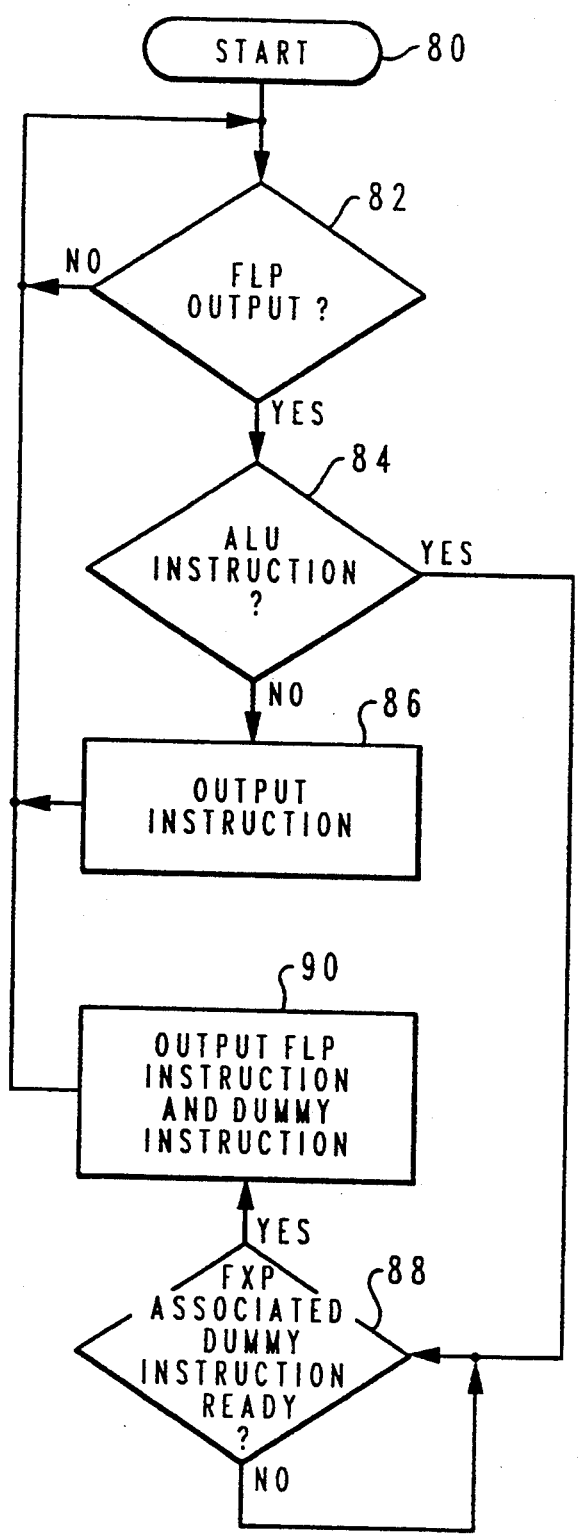
FIG. 4 is a high level logic flowchart illustrating the synchronization of floating point processor unit output with an output from the fixed point processor unit in accordance with the method and system of the present invention.

Finally, with reference to FIG. 4, there is depicted a high level logic flowchart which illustrates the synchronization of the output of floating point processor unit 24 with an output from fixed point processor unit 26 in accordance with the method and system of the present invention (see FIG. 1). In a manner similar to that described above, the process begins at block 80 and thereafter passes to block 82. Block 82 illustrates the detection of a floating point processor unit output and in the absence of a floating point processor unit output the process merely iterates until such time as a floating point processor unit output occurs.

Upon the detection of a floating point processor unit output, as illustrated at block 82, the process passes to block 84. Block 84 illustrates a determination of whether or not the output from the floating point processor unit is an arithmetic instruction (alu) and if not, the process passes to block 86. Block 86 illustrates the output of that instruction and the process then returns to block 82, in an iterative fashion.

Referring again to block 84, in the event the output from the floating point processor unit is an arithmetic instruction (alu), the process passes to block 88. Block 88 illustrates a determination of whether or not the associated dummy instruction within the fixed point processor unit is ready for output, and if not, the process merely iterates and the output of the floating point processor unit is gated until such time as the associated dummy instruction within the fixed point processor unit is ready for output. After determining that the associated dummy instruction within the fixed point processor unit is ready for output, the process passes to block 90. Block 90 illustrates the outputting of the floating point instruction and the associated dummy instruction and the process then returns, in an iterative fashion, to block 82.

The method and system of the present invention by forces floating point processor unit arithmetic instructions (alu) into the fixed point processor unit pipeline by utilizing an associated dummy instruction having a retained instruction address. In this manner, an addresses associated with each floating point processor unit instruction may be retained within an instruction address register corresponding to each point within the fixed point pipeline which contains a dummy instruction. Thereafter, the method and system of the present invention requires the fixed point processor unit to wait for the floating point processor unit before allowing a floating point processor unit to clear write-back. In this mode of operation, the precise address of a floating point processor unit instruction which initiates a floating point exception may be determined without substantially degrading performance of the system.

When operated in the manner described herein, the processor in a multiscalar processor system will run at the full speed of the slower of the fixed point processor unit or the floating point processor unit, with the only system degradation occurring as a result of the positioning of floating point processor unit arithmetic instructions within a pipeline position in the fixed point processor unit pipeline. It should be noted that the branch processing unit typically provided within a multiscalar processor system is not affected by the method and system of the present invention.

In systems in which the floating point processor unit includes a two cycle pipeline for double precision arithmetic operations and the fixed point processor unit pipeline is generally a one cycle pipeline, no performance degradation will occur in instruction streams which include large numbers of floating point arithmetic instructions, since the system will be gated by the floating point processor unit in both the exception enabled and exception not enabled modes of operation.

In instruction streams which are gated by fixed point performance, selection of the floating point exception enabled mode of operation will cause a slight performance degradation due to the fact that the fixed point processor unit pipeline will be more populous; however, since there are not very many floating point arithmetic instructions and since the floating point operation is generally done with an instruction before the fixed point processor unit is ready for that instruction to clear write-back, system degradation will only result in about one cycle per floating point arithmetic instruction. In situations in which the fixed point processor unit is gating performance within the system in the normal mode there must be fewer than 33% floating point arithmetic instructions, since the floating point processor pipeline has a one cycle stall per instruction in a double precision arithmetic operation, the degradation resulting from enabling floating point exception operation in accordance with the method and system of the present invention is generally less than a factor of two.

While the invention has been particularly shown and described with reference to a preferred embodiment, it will be understood by those skilled in the art that various changes in form and detail may be made therein without departing from the spirit and scope of the invention.

We claim:

1. A method for enabling high speed floating point exception enabled operation in a multiscalar processor system having a floating point processor unit, a fixed point processor unit and means for simultaneously dispatching instructions to multiple processor units, said method comprising the steps of:

simultaneously dispatching an associated dummy instruction having a retained instruction address to said fixed point processor unit in response to each arithmetic instruction dispatched to said floating point processor unit;

synchronizing an output of each arithmetic instruction from said floating point processor unit with an output of an associated dummy instruction from said fixed point processor unit wherein each arithmetic instruction within said floating point processor unit which initiates an occurrence of a floating point exception is accurately identified.

2. The method for enabling high speed floating point exception enabled operation in a multiscalar processor system according to claim 1, wherein said step of synchronizing an output of each arithmetic instruction from said floating point processor unit with an output of an associated dummy instruction from said fixed point processor unit comprises the step of delaying an output of an associated dummy instruction from said fixed point processor unit until an occurrence of an output of an arithmetic instruction from said floating point processor unit.

3. The method for enabling high speed floating point exception enabled operation in a multiscalar processor system according to claim 1, wherein said step of synchronizing an output of each arithmetic instruction from said floating point processor unit with an output of an associated dummy instruction from said fixed point processor unit comprises the step of delaying an output of an arithmetic instruction from said floating point processor unit until an occurrence of an output of an associated dummy instruction from said fixed point processor unit.

4. A system for enabling high speed floating point exception enabled operation in a multiscalar processor system having a floating point processor unit, a fixed point processor unit and means for simultaneously dispatching instructions to multiple processor units, said system comprising the steps of:

means for simultaneously dispatching an associated dummy instruction having a retained instruction address to said fixed point processor unit in response to each arithmetic instruction dispatched to said floating point processor unit;

means for synchronizing an output of each instruction from said floating point processor unit with an output of an associated dummy instruction from said fixed point processor unit wherein each arithmetic instruction within said floating point processor unit which initiates an occurrence of a floating point exception is accurately identified.

5. The method for high speed floating point exception enabled operation in a multiscalar processor system according to claim 4, wherein said means for synchronizing an output of each arithmetic instruction from said floating point processor unit with an output of an associated dummy instruction from said fixed point processor unit comprises means for delaying an output of an associated dummy instruction from said fixed point processor unit until an occurrence of an output of an arithmetic instruction from said floating point processor unit.

6. The method for high speed floating point exception enabled operation in a multiscalar processor system according to claim 4, wherein said means for synchronizing an output of each arithmetic instruction from said floating point processor unit with an output of an associated dummy instruction from said fixed point processor unit comprises means for delaying an output of an arithmetic instruction from said floating point processor unit until an occurrence of an associated dummy instruction from said fixed point processor unit.

* * * * *